United States Patent
Paul

(10) Patent No.: US 6,570,747 B1
(45) Date of Patent: May 27, 2003

(54) LOW-TEMPERATURE APPARATUS

(75) Inventor: Willi Paul, Wettingen (CH)

(73) Assignee: ABB Research Ltd, Zurich (CH)

( * ) Notice: Subject to any disclaimer, the term of this patent is extended or adjusted under 35 U.S.C. 154(b) by 259 days.

(21) Appl. No.: 09/671,308

(22) Filed: Sep. 28, 2000

(30) Foreign Application Priority Data

Oct. 1, 1999 (DE) .......................... 199 47 410

(51) Int. Cl.$^7$ .................. H02H 9/00; G01F 23/20; F17C 1/00
(52) U.S. Cl. ...................... 361/19; 73/295; 62/45.1
(58) Field of Search ................... 361/19; 73/295; 62/45.1, 268, 51.1, 259.2

(56) References Cited

U.S. PATENT DOCUMENTS

| | | | |
|---|---|---|---|
| 3,644,803 A | * | 2/1972 | Levi .......................... 257/716 |
| 3,812,314 A | * | 5/1974 | Nonken ....................... 218/138 |
| 4,879,441 A | * | 11/1989 | Hamm et al. ................ 200/144 |
| 4,994,932 A | * | 2/1991 | Okamoto et al. ............. 361/19 |

FOREIGN PATENT DOCUMENTS

| | | |
|---|---|---|
| DE | 3724562 C1 | 1/1989 |
| DE | 3844053 C2 | 7/1990 |
| DE | 19524579 A1 | 1/1997 |
| DE | 19628358 C1 | 1/1998 |
| EP | 0926797 A2 | 6/1999 |

OTHER PUBLICATIONS

"Supraleitende Strombegrenzer in der Energietechnik", Noe, et al., Elektrie, 1997, pp. 414–422. No Date.

* cited by examiner

*Primary Examiner*—Rajnikant B. Patel
(74) *Attorney, Agent, or Firm*—Burns, Doane, Swecker & Mathis, L.L.P.

(57) ABSTRACT

An apparatus in the field of power transmission, the apparatus includes a superconducting component or another component to be cooled, in a cryostat. A vacuum switch is provided in order to prevent heat being introduced into the cryostat by means of thermal conduction through the electricity cable of the component in the event of an electricity failure. This vacuum switch is integrated in a bushing in the electricity cable, so that its vacuum completes the thermal insulation of the cryostat.

11 Claims, 1 Drawing Sheet

LOW-TEMPERATURE APPARATUS

FIELD OF THE INVENTION

The present invention relates to the technical use of electrical components at an operating temperature below room temperature.

BACKGROUND OF THE INVENTION

Electrical components such as current limiters, cables or transformers with components made of superconducting materials are suitable for use in power supply networks owing to the reduced resistive losses. However, said components must be cooled to an operating temperature which is considerably below ambient temperature or room temperature. The superconducting components are for this purpose arranged in a coolant container, called a cryostat, and are cooled to the intended operating temperature by coolant, preferably by liquid nitrogen in the case of high-temperature superconducting materials.

Heat is carried into the cryostat via normally conductive input and/or output cables, by means of which the low-temperature components to be cooled are connected to the transmission network, which is at room temperature. These cables are designed such that, during continuous operation, the heat introduced into the cryostat is caused in roughly equal proportions by the resistive heating produced by the rated current flowing in the cables and by heat conduction. A disadvantage in this case is that, even when the electrical current is interrupted, that is to say when the low-temperature apparatus is not being used, heat is still carried through the cables into the cryostat, and corresponding cooling power is required.

Current limiters used in power supply networks and based on superconducters are able to limit potential short-circuit currents to a value close to the rated current which can be carried during continuous operation. EP 0 926 797 A2 discloses an apparatus to limit overcurrents, comprising a parallel circuit formed by an induction coil with a series circuit formed from a high-temperature superconductor and a switch which is closed during normal operation. For its own protection, the superconductor is loaded by the overcurrent for only a short time after a short circuit, for example during the first half cycle, and the load is removed as soon as possible by opening the interrupter. From then on, the short-circuit current is limited by the parallel-connected induction coil. The switch is not closed again until the short circuit has been corrected and the high-temperature superconductor has once again been cooled down to the operating temperature.

It is also known that conventional vacuum switches for the medium-voltage range can be produced cost-effectively. These are normally opened at the zero crossing of a current that is to be interrupted. Their disadvantage is that asymmetrical currents with no zero crossings cannot be switched off safely. U.S. Pat. No. 3,812,314 describes a vacuum switch for underground transformers, which is installed in a plastic bushing for cost and space reasons. The ceramic of the switch housing is in this case completely surrounded by the plastic insulation of the bushing. A flange in the bushing allows it to be connected in a hermetically sealed manner to a wall of a transformer container.

SUMMARY OF THE INVENTION

The object is to reduce the heat supplied to a cryostat via an electricity cable leading to a low-temperature component.

This object is achieved by a low-temperature apparatus having the features of the present invention.

The essence of the invention is the provision of a vacuum switch to interrupt the electrical cable and the integration of this vacuum switch in a bushing, which leads to the interior of a cryostat, of the electrical cable. The vacuum of the switch thus complements the thermal insulation of the cryostat, which is interrupted in the region of the bushing. Particularly in the switched-off state, that is to say when the switch is open, the introduction of heat into the cryostat is thus considerably reduced.

According to a first embodiment, the vacuum flask of the switch and the bushing insulation are each manufactured from a poorly thermally conductive electrical insulator, and they are preferably actually identical.

According to a second embodiment, the electrical input and/or output cables lead to a component which is located in the cryostat and is based on a high-temperature superconductor. The coolants in this case are preferably liquid nitrogen.

In a further embodiment, the low-temperature component is a superconducting current limiter. This embodiment is based on the knowledge that a short-circuit current is limited symmetrically when a superconductor-based current limiter is used, that is to say no significant direct-current offset components occur. For this reason, a switch which switches safely only at a current zero crossing is sufficient to interrupt the electrical cable to be protected. A combination of a superconducting current limiter and vacuum switch thus likewise has an explicitly inventive character.

BRIEF DESCRIPTION OF THE DRAWINGS

Preferred embodiments of the invention are disclosed in the following description and illustrated in the accompanying drawings in which.

DETAILED DESCRIPTION OF THE INVENTION

In principle, identical parts are provided with the same reference symbols.

Figure 1:
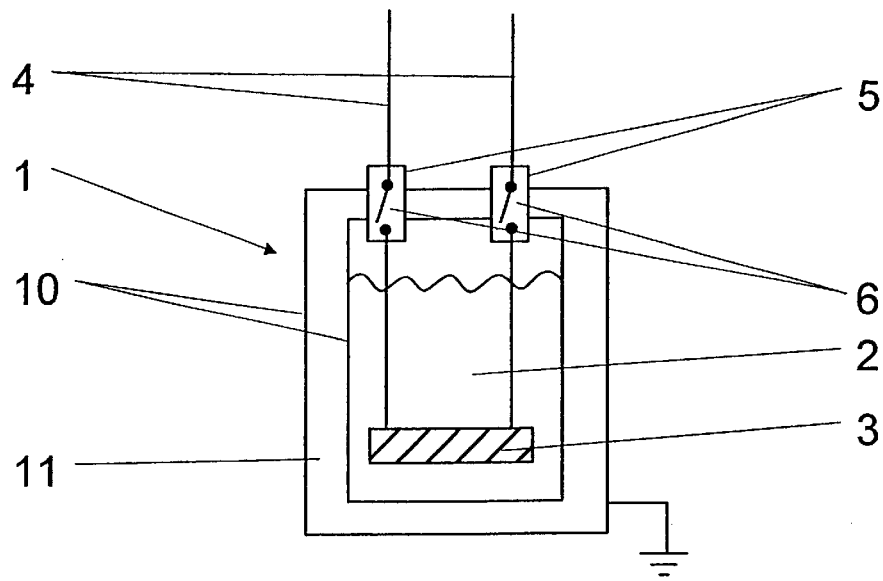
FIG. 1 shows a low-temperature apparatus according to the invention.

FIG. 1 shows a low-temperature apparatus together with a cryostat 1 and a cooling liquid 2 contained in it. The cryostat 1 preferably has two walls, with a vacuum 11 between the cryostat walls 10 ensuring thermal insulation of the cooled interior of the cryostat 1. A low-temperature component 3, which is cooled to its operating temperature by the cooling liquid 2, is connected to an electricity supply network, which is not shown, via at least two input or output cables 4. The input or output cables 4 are passed into and out of the cryostat 1 by means of so-called bushings 5. According to the invention, a vacuum switch 6 is integrated in each of the bushings 5, which are arranged in holes through the cryostat walls 10.

Figure 2:
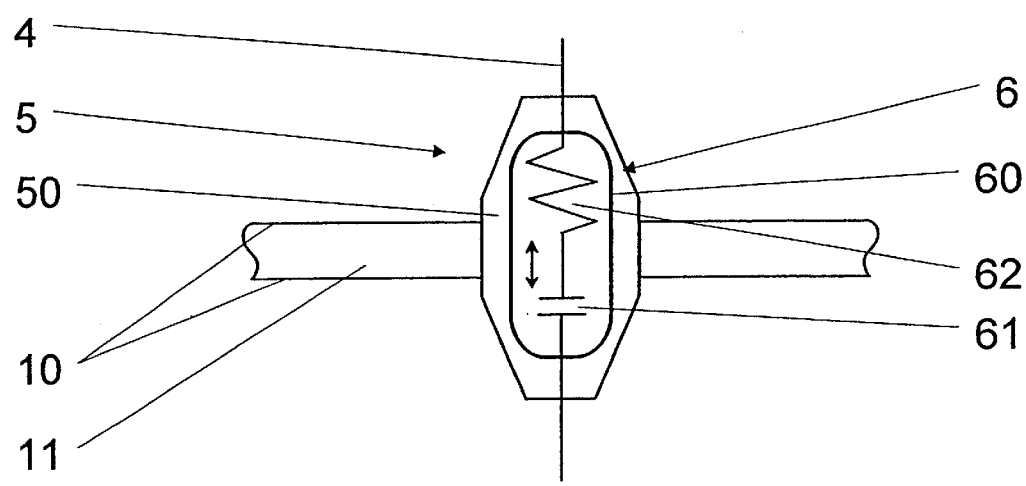
FIG. 2 shows an electrical bushing with an integrated vacuum switch.

FIG. 2 shows a combination of a bushing 5 and a vacuum switch 6. A vacuum flask 60 forms the actual switching chamber, in which two switching pieces or contacts 61, which are arranged on a shaft, are located. At least one of the two contacts, preferably that facing the electricity supply network, can be moved axially by means of a mechanical drive, which is not shown. A folding sleeve or a spring element 62 is provided for position compensation. The bushing 5 comprises an electrically insulating body 50, which is connected to the cryostat walls 10 directly or via a flange.

The vacuum 11 of the cryostat 1, or the thermal insulation, is interrupted in the area of the bushings 5. The bushings are normally designed such that no major electrical fields are formed between the conductor 4, which is at a high electrical potential, and the cryostat 1, or its walls 10, which is or are normally grounded. However, a large distance between the conductor 4 and the cryostat wall 10 with the electrical bushing insulation 50 having a corresponding extent at right angles to the conductor 4 (that is to say in the plane of the cryostat wall 10) results in considerable thermal conductivity through this insulation 50 itself.

In contrast, in the case of the bushing 5 shown in FIG. 2, a portion of the electrical insulation between the conductor 4 and the cryostat 1 is provided by the vacuum of the switch 6. In consequence, the said extent of the insulating body 50 at right angles to the conductor 4 can be reduced. In consequence, the thermal conductivity in the insulation 50 parallel to the conductor 4, and thus the heat introduced into the cryostat 1, are reduced. Furthermore, when the vacuum switch 6 is open, not only the electrical current but also the thermal conduction through the conductor 4 itself are interrupted. Only that one of the two switching contacts 61 which faces the component 3 remains connected to the coolant, and the outer contact is heated to room temperature once the switch has been opened.

In order to further reduce the heat introduced into the cryostat 1, attention is likewise paid to good thermal insulation when choosing materials for the bushing insulation 50 and the vacuum flask 60. Suitable materials are, for example, glass or porcelain, which have low coefficients of thermal conductivity of 0.8 W/km and 2.5 W/km, respectively, at room temperature. If the electrical insulation of the vacuum flask 60 is actually sufficient on its own, the insulation 50 can be further optimized, in terms of its thermal characteristics, and can be manufactured from a foam material. Furthermore, the thermal coefficients of expansion of the materials used should also not be ignored, since there is a considerable temperature difference between the two end faces of the bushing. For this reason, the bushing insulation 50 and vacuum flash 60 may also be manufactured in combined form, that is to say integrally from a preferably ceramic insulator.

The low-temperature component 3 must be cooled by coolant to its operating temperature which, in the case of superconductor-based components for example, is below the critical temperature of the superconductor material being used. For this purpose, the component can be placed directly onto a cooling element, which is in turn connected to a refrigeration machine arranged outside the cryostat. The cold reservoir may alternatively be contained as cooling liquid 2 in the cryostat 1 with, for the sake of simplicity, the low-temperature component 3 being immersed in the cooling liquid 2. If the cryostat 1 is sealed such that it is airtight, the boiling point of the cooling liquid 2, and thus the operating temperature of the low-temperature component 3, can be influenced by controlled pressure changes.

The fact that a vacuum switch 6 installed according to the invention is in thermal contact with the cooled interior of the cryostat 1 contributes to additional improvement of the switch vacuum due to the cryopump effect. For this reason, gas-insulated switches are clearly less suitable, since either the improved electrical insulation is obtained at the expense of increased thermal conductivity, or the insulating gas may possible condense on the bottom of the switching chamber.

A further advantage is that the switch 6 installed according to the invention can be loaded with a higher rated current when in the closed state than the same switch outside the cryostat. This is because the contacts 61 are heated less severely, and also profit by being cooled by the coolants.

If the low-temperature component 3 is a superconducting current limiter, then a series circuit having a vacuum switch 6 is also distinguished by further advantages. An overcurrent which, for example, is limited by a pure inductance possibly has a significant direct-current component, which no longer ensures that a vacuum switch will switch off safely. In contrast, an overcurrent which is limited symmetrically by a superconducting current limiter has cyclic zero crossings, as during continuous operation at the rated current. This ensures that it is possible to interrupt the electrical cable 4 without any problems by opening the vacuum switch 6 even after a short circuit and subsequent current limiting. The use of superconducting low-temperature components thus allows the use of conventional vacuum switches for current limiter applications as well.

Although this invention has been illustrated and described in accordance with certain preferred embodiments, it is recognized that the scope of this invention is to be determined by the following claims.

What is claimed is:

1. A low-temperature apparatus comprising:
   a) an electrical low-temperature component which can be switched off;
   b) at least one electrical cable for connecting the low-temperature component to an electricity supply network;
   c) a bushing for carrying the at least one electricity cable into and out of a cryostat; and
   d) a switch which is arranged in series with the low-temperature component in the electrical cable wherein
   e) the switch is a vacuum switch and is arranged in the bushing.

2. The apparatus as claimed in claim 1, wherein the bushing has an electrically insulating body, and said body comprises a thermally insulating material.

3. The apparatus as claimed in claim 2, wherein the electrically insulating body of the bushing comprises ceramic, porcelain or glass.

4. The apparatus as claimed in claim 2, wherein the vacuum switch has a vacuum flask, and the vacuum flask is identical to the electrically insulating body of the bushing.

5. The apparatus as claimed in claim 1, wherein the cryostat has two walls and has a thermally insulating vacuum.

6. The apparatus as claimed in claim 1, wherein the low-temperature component at least partially comprises high temperature superconducting materials.

7. The apparatus as claimed in claim 6, wherein a cooling medium is a cooling liquid.

8. The apparatus as claimed in claim 7, wherein in the cooling medium is liquid nitrogen.

9. The apparatus as claimed in claim 6, wherein the low-temperature component is a superconducting transformer.

10. The apparatus as claimed in claim 6, wherein the low-temperature component is a superconducting current limiter.

11. A low-temperature apparatus comprising an electrical low-temperature component which can be switched off, at least one electrical cable for connecting the low-temperature component to an electricity supply network, a bushing for carrying the at least one electricity cable into and out of a cryostat, a switch arranged in series with the low-temperature component in the electrical cable, wherein the switch is a vacuum switch arranged in the bushing.

* * * * *